Feb. 6, 1951  H. T. JEFFERY  2,540,948
APPARATUS FOR AERATING LIQUIDS
Filed Oct. 4, 1946  2 Sheets-Sheet 1
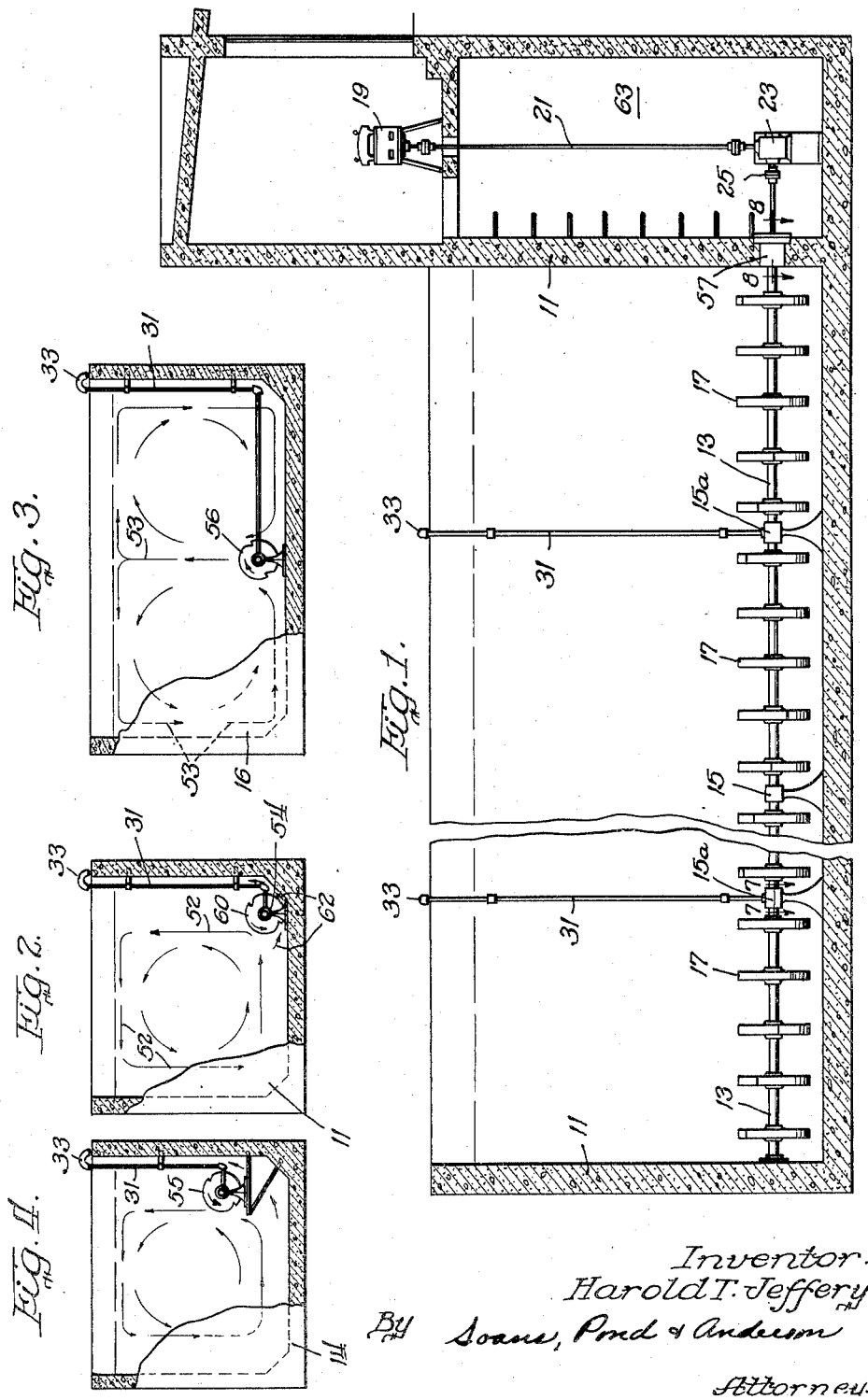
Inventor.
Harold T. Jeffery
By Soans, Pond & Anderson
Attorneys Feb. 6, 1951 H. T. JEFFERY 2,540,948
APPARATUS FOR AERATING LIQUIDS
Filed Oct. 4, 1946 2 Sheets-Sheet 2
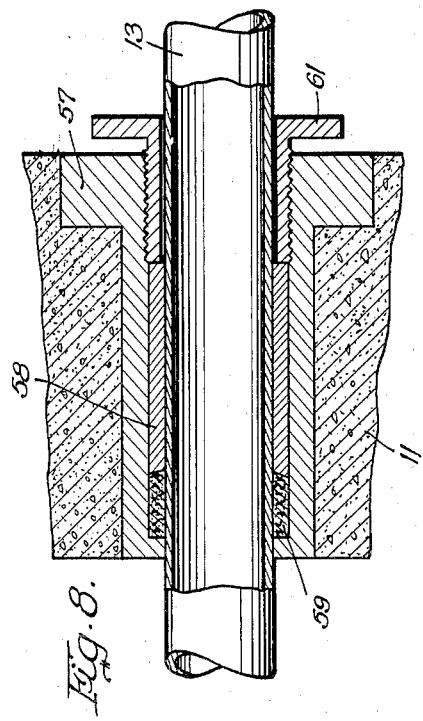
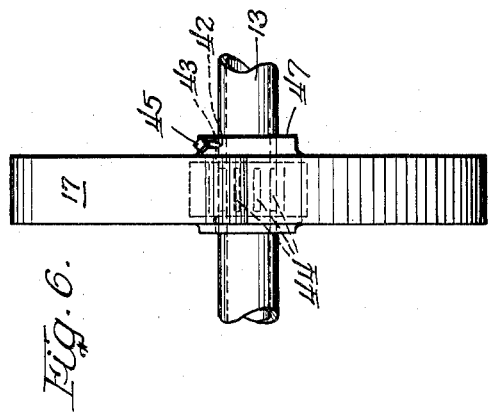
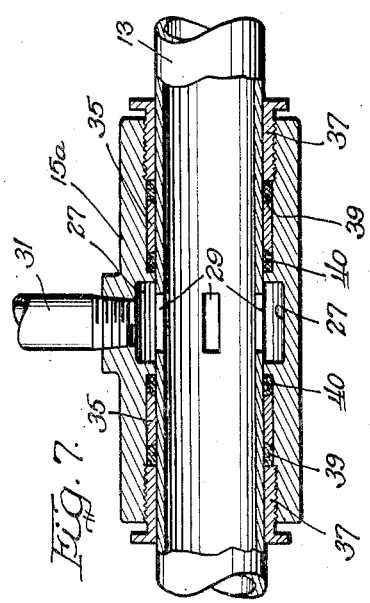
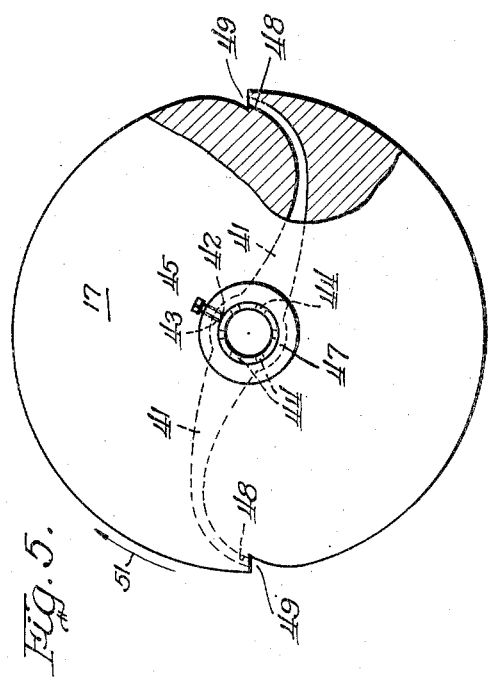
Inventor:
Harold T. Jeffery.
By Soane, Pond & Anderson
Attorneys.

Patented Feb. 6, 1951

2,540,948

UNITED STATES PATENT OFFICE 2,540,948

APPARATUS FOR AERATING LIQUIDS

Harold T. Jeffery, Wilmette, Ill., assignor to Yeomans Brothers Company, Chicago, Ill., a corporation of Delaware Application October 4, 1946, Serial No. 701,335

4 Claims. (Cl. 261—93)

The present invention relates generally to improved equipment for diffusing gases through liquids and is particularly concerned with equipment for aerating sewage and other waste materials by the use of a rotary air diffuser.

One of the most important steps in the disposal of sewage is the aeration of the various liquid and suspended solid components of the sewage by diffusion, agitation, or other procedures, to encourage the growth of aerobic bacteria with the resultant nitrification and oxidation of the waste materials. The present systems of aeration by diffusion utilize porous plate or tube structures and air is forced therethrough by suitable pumps or compressors. These systems are not wholly satisfactory because of the inherent high power demands of the pumping equipment and the relatively short life of the diffusion plates or tubes, with attendant high maintenance costs. However, the systems provide underwater liberation of the air and accomplish very efficient aeration of the liquid being treated.

The object of the present invention is to provide an improved tank aerating device operable to effect underwater aeration of sewage or other liquids being treated by introducing therein finely divided air bubbles similar to the known underwater diffusion systems, but with greatly decreased power consumptions and lower maintenance costs. The invention thus makes possible an aerating system with all the advantages of the known underwater diffusion systems, but without the disadvantages of such systems. Another object of the invention is to provide an aeration device in accordance with the above stated principal object which can be installed in conventional diffusion aeration tanks without substantial modification thereof. Further objects and advantages of the invention will be understood by reference to the following specifications with the accompanying drawings.

In the drawings:

Fig. 1 is a sectional, side elevational view of an aeration device in accordance with the invention, installed in a conventional concrete tank;

Figs. 2, 3 and 4 are end elevational views, partially in section, of typical installations of the aeration devices of the invention;

Fig. 5 is a side elevation view, partially in section, of an impeller suitable for use in the aeration devices of the invention;

Fig. 6 is an end elevational view of the impeller illustrated in Fig. 5;

Fig. 7 is a sectional view on the general line 7—7 of Fig. 1; and

Fig. 8 is a sectional view on the general line 8—8 of Fig. 1.

The aeration device of the present invention comprises a hollow shaft having mounted thereon a plurality of impellers or diffusers. Means is provided for rotating the shaft and the impellers, and the hollow portion of the shaft is connected through suitable conducting means to the atmosphere. The impellers each contain a plurality of air passageways which are in communication at the hub of the impeller with the hollow portion of the shaft and extend outward from the hub to a notch or recess in the periphery of the impeller.

When the shaft and its attached rotors of the aerating device are rotated by the source of power, the notches in the periphery of the individual impellers passing through the substantially quiescent liquid, causes a suction or aspirating effect. This acts to draw air from the hollow shaft, through the air passageways in the impellers, and discharges that air in an attenuated stream of small sized bubbles into the surrounding liquid. The required rate of rotation to effect aeration depends chiefly upon the diameter of the rotors and the head of liquid to be overcome, and to a lesser extent upon the design of the impeller units.

Fig. 1 shows the installation of a rotary air diffuser in accordance with the invention in an aerating tank 11 of the type usually employed in the activated sludge process. The tank 11 is of concrete construction and may be from about 12 to 20 feet deep and about 60 to 120 feet in length. The hollow shaft 13 in this installation is rotatably mounted in suitable bearings 15 which are spaced at about 10 foot intervals along the length of the shaft. A plurality of impellers 17 are mounted normal to the axis of said shaft, at about 2 foot intervals along the axis. The rotating unit, comprising the hollow shaft 13 and the plurality of impellers 17, is adapted to be rotated by an electric motor 19, or other suitable source of power, such as a digester gas engine, acting through shaft 21, gear box 23, and coupling 25.

Upon rotation the individual impellers draw air from the hollow shaft 13, as heretofore described, said air being conveniently supplied from suitable connections at some of the bearings 15. The cross section of a typical air supplying bearing 15a is shown in Fig. 7. The bearing 15a contains an annular groove 27 which is coincident with a series of slots 29 in the wall of the hollow shaft 13. Air flows to the annular groove 27 from the atmosphere through an air inlet pipeline 31 which extends above the surface of the liquid in the tank and terminates in a U connection 33 designed to exclude trash and other foreign material from the air intake pipeline 31. Sleeve bearing inserts 35 are provided to effect the support of the shaft 13. Other bearings such as roller bearings may be provided to effect a reduction in the frictional losses. Liquid is excluded from the air passageways during operation, and from the bearing surfaces at all times by the packing glands 37 and the packing 39 and 40. The packing 39 and 40 also serves to exclude abrasive materials from the bearing surfaces and increases the life of the bearing surfaces. It may be found desirable, depending upon the installation, to provide auxiliary supporting bearings at various positions along the shaft and to provide separate air intake bearings which have but little supporting action.

In the illustrated embodiment of the invention the impellers 17 are disc-shaped, as shown in Figs. 5 and 6, enabling them to be rotated in the liquid without excessive friction losses. The disc-shaped impellers, each containing a pair of diametrically opposed, radially extending, air passageways 41, may be milled from a metal casting, molded from plastic, or fabricated from other materials by methods known to the art. Each of the discs 17 is adapted to be mounted upon the shaft 13 by means of a key 42, which engages the keyway 43, and a set screw 45 which fits in a tapped hole in the impeller hub 47. The impellers 17 are mounted on the shaft 13 over slots 44 provided in the shaft to allow the free passage of air to the air passageways in the rotor. The joint around the hub should be wiped with lead, solder, or other sealing substance to insure an airtight bond between the inner surface of the hub 47 and the outer surface of the shaft. The air passageways 41 in the impeller terminate at their outer ends 48 in the notches or recesses 49 on the periphery of the disc.

The shaft 13 and impeller discs 17 are rotated as a unit in the direction shown by arrow 51. The passage of the notches 49 through the surrounding liquid acts to cause a suction or aspirating effect at the mouth of each of the air passageways 48. When the peripheral speed of the notch 49 is increased to a speed which will cause the pressure produced by aspirating effect to equal the pressure due to the head of the liquid in the tank, air will be drawn from the atmosphere through the pipeline 31 to the bearing 15a, through the hollow shaft 13, and then through the air passageways 41 in the rotors 17. As the air is drawn to the mouths of the air passageways at 48 the turbulent eddy currents in the liquid, caused by the movement of notch 49, effectively break the air into an attenuated stream of small diameter bubbles.

My investigations have shown that an impeller which has a diameter of 24 inches should be rotated at about 290 R. P. M. to overcome a 16 foot head of water so as to effect aeration. If the diameter is increased to 36 inches, the rate of rotation may be reduced to about 192 R. P. M. to effect aeration in an identical tank.

The design of the impellers for my aeration device is not limited to the embodiment shown in the drawings. The impellers should be so shaped as to require a minimum of power to be expended in their rotation. The impellers may be made with a plurality of arms which contain air passageways with the mouths of said passageways facing in a direction opposite to the direction of rotation. It may even be desirable to fabricate a hollow impeller which has deflecting surfaces around its periphery so shaped that they act upon rotation, in a manner that will draw air from the hollow shaft and disperse it into the liquid.

The rotating diffuser units may be installed in the conventional aerating tanks that are now in vogue to obtain the various desired convection flow patterns. The arrows 52, Fig. 2, show the conventional single spiral convection flow that is obtained by installing the rotating diffuser unit 54 at the base of one wall of the tank 11. It has been determined by my investigations that a large portion of the effective aeration and the resultant reduction in the biologic oxygen demand (B. O. D.) occurs when the liquid circulates across the air-liquid interface at the surface of the tank. One of the reasons for the efficient operation of the rotary air diffuser is that the circulation in the tank is materially increased by the liquid which rotates sympathetically with the rotating unit because of fluid friction. Thus, a large part of the frictional loss in the system is used to increase the convection currents, thereby increasing the aeration which occurs at the air-liquid interface. When the rotor 54 is rotated in the direction shown by the arrow 60 increased circulating currents are produced by fluid friction of the rotary unit 54 between the wall of the tank 11 and the unit 54 as shown by the arrows 62.

It is advantageous in some installations to install the rotary air diffuser unit 55 at a point somewhat above the bottom of the tank 14 as is shown in Fig. 4. An insallation of this type results in a decrease in the head of liquid to be overcome with the resulting decrease in rate of rotation and power needed to rotate the air diffuser unit without resulting in a proportional decrease in aerating effect. The optimum distance from the bottom of the tank varies with the B. O. D. of the liquid, but in an ordinary disposal system, with tanks about 16 feet deep, the rotating diffuser unit could be advantageously located approximately two feet above the level of the bottom.

A double spiral convection flow is shown in Fig. 3. Upon aeration the air rises from the air diffuser unit 56 and tends to raise the liquid along with it. Upon reaching the surface the liquid separates and flows to the outer walls of the tank 16, thus effecting double spiral flow as is shown by the arrows 53. The double spiral flow is advantageous where wide aeration tanks are installed as it insures that liquid is moving across the entire surface of the air-liquid boundary and results in more efficient aeration of the liquid.

A conventional stuffing box, as illustrated at 57 in Fig. 8, must be provided at the point where the shaft enters the tank. The stuffing box 57 is sealed into the concrete wall of tank 11, and is provided with the packing filled chamber 59 and a sleeve bearing insert 58. The packing gland 61 is adaptable to compress the packing in the chamber 59 by pressure exerted upon the bearing 58. A stuffing box of the type described excludes liquid from the bearing 58 and the sump 63 and facilitates adjustment of the packing gland 61 while the air diffuser is operating.

In an exemplary sewage treatment plant designed to treat a million gallons of sewage per day with an average B. O. D. content of 200 parts per million (P. P. M.), about 700,000 cubic feet of free air are required to reduce the B. O. D. content to a safe value. This volume of air can be supplied by the use of a diffuser unit in accordance with the invention having about 60 impellers and operating in an aeration tank which is about 16 feet deep and 120 feet in length, the rotors having a diameter of 24 inches, and rotating at 290 R. P. M. Tests have shown that an average of one-sixth horsepower is required for every impeller in the unit; therefore, only ten horsepower are required to diffuse this volume of air into the liquid. If the same volume of air was supplied by a standard air compressor, and introduced into the liquid through porous diffusion media, at least a thirty-five horsepower motor would be needed to furnish the required quantities of air. In disposal systems of similar capacity wherein the sewage components are aerated by mechanical means, such as sprays and rotating agitators, even more power is required and less efficient aeration may result.

An aeration system of the class described can be used advantageously in the aeration of drinking water. The small amount of power required and the simple mechanical requirements of the diffuser unit make it ideal for installations that are designed to aerate the water in large tanks. Many aeration devices for water purification depend upon an air compressor as their source of air and there is some danger in such cases of inclusion of compressor cylinder oil in the air that is passed through the water with the resulting undesirable taste characteristics.

The most important advantages of the invention are low operating costs and low maintenance cost with high efficiency aeration. As heretofore stated, the power requirements of the system are about one-third of the requirements of other known aeration systems. The air passages in the impellers and hollow shaft are large enough that they will rarely become clogged if sewage is allowed to back up into the diffuser when the diffusers move below the critical rate. If clogging does occur, the lines may be cleared by connecting a compressed air line to the riser pipelines 31 and passing surges of compressed air through the diffuser unit while it is rotating. The rotary air diffuser eliminates the possibility of the introduction of oil and other foreign materials into the pipelines and liquid. Rotary systems of this type require no standby power as they are not damaged by accidental stoppages.

The features of my invention that I believe to be new are expressly set forth in the following claims.

I claim the following as my invention:

1. In combination in apparatus of the class described, an elongated, horizontally disposed tank having side and bottom walls for containing a body of liquid or semi-liquid material which is to be treated, and a submerged air diffusion means which extends longitudinally of said tank and which is positioned adjacent the bottom wall thereof, said air diffusion means including a plurality of spaced apart bearings, a horizontally disposed, hollow shaft journalled in said bearings, a plurality of air diffusion impeller discs supported upon said shaft at spaced intervals for rotation in planes normal to the axis of said shaft, each of said impellers having a plurality of outwardly extending air passageways, each of which is open at the periphery of said disc to the material contained in said tank and each of which connects at the other end thereof with the interior of said hollow shaft, conduit means for admitting air at atmospheric pressure to the interior of said hollow shaft, and a source of power for rotating said air diffuser unit whereby the rotation of said impellers will cause air to flow through said conduit means, into and through said shaft, and thence via the said passageways within said impeller discs into said material, said source of power being operable to rotate said diffuser unit at such speed that the air flowing into said material is in the form of attenuated streams of small diameter bubbles, which are of such dimensions that said streams of bubbles in ascending through said material produce circulating currents in the body of material contained in said tank, which currents flow across the surface of said body of material.

2. In combination in a system of the class described, an elongated, horizontally disposed tank having side and bottom walls for containing a body of liquid or semi-liquid material requiring aeration and circulation, and aeration means for effecting the aeration and circulation of said liquid, said means being operable to provide within said tank attenuated streams of small diameter bubbles, which are of such dimensions that said streams in ascending through the material contained in said tank produce currents of liquid which rise to the surface of the liquid within the tank, which then flow across at least a portion of the surface of the liquid in the tank, and which finally descend to the bottom of the tank, said aeration means comprising a submerged, rotatable air diffuser unit which is located adjacent the bottom wall of said tank, and a source of power for rotating said unit, said diffuser unit including bearing supports, a horizontally disposed, hollow shaft journalled in said supports, a plurality of air diffusion impeller discs supported at spaced intervals upon said shaft for rotation in planes normal to the axis of said shaft, each of said discs being provided with at least one outwardly extending air-discharge passageway which is open at the outer periphery of said disc to the material to be aerated and each of which connects at the inner end thereof with the interior of said hollow shaft, and means for freely admitting air from the atmosphere to the interior of said hollow shaft through at least some of said bearing supports of said shaft, said diffuser unit being positioned along the bottom of said tank, longitudinally thereof, below the region in which upwardly flowing currents of liquid are required.

3. In combination in a system of the class described, an elongated, horizontally disposed tank having side and bottom walls for containing a liquid or semi-liquid material which is to be treated, a submerged, rotatable air diffuser unit extending longitudinally of said tank adjacent the bottom wall thereof, and a source of power for rotating said diffuser unit, said diffuser unit comprising a plurality of spaced apart bearings, a horizontally disposed, hollow shaft journalled in said bearings, a plurality of spaced apart air diffusion impeller discs supported upon said shaft for rotation in planes normal to the axis of said shaft, each of said discs having a plurality of outwardly extending air passageways, each of which is open at the periphery of said disc to the material to be treated and each of which connects at the other end thereof with the interior of said hollow shaft, at least some of said shaft bearings having annular grooves which communicate with the interior of said hollow shaft by means of slots provided in said shaft, and conduit means connecting said annular grooves with the atmosphere whereby the rotation of said impellers will cause air to flow through said conduit means, into and through said hollow shaft and thence via the said passageways within said impeller discs into said material, and said source of power being operable to rotate said diffuser unit at such speed that the air flowing into said material is in the form of attenuated streams of small diameter bubbles.

4. In combination in apparatus of the class described, an elongated, horizontally disposed tank having side and bottom walls for containing a body of liquid or semi-liquid material which is to be treated, and a submerged air diffusion means which extends longitudinally of said tank and which is positioned adjacent the bottom wall thereof, said air diffusion means including a plurality of spaced apart bearings, a horizontally disposed, hollow shaft journalled in said bearings, a plurality of air diffusion impeller discs supported upon said shaft at spaced intervals for rotation in planes normal to the axis of said shaft, each of said impellers having at least one outwardly extending air passageway which is open at the periphery of said disc to the material contained in said tank and which connects at the other end thereof with the interior of said hollow shaft, conduit means for admitting air to the interior of said hollow shaft, and a source of power for rotating said air diffuser unit whereby the rotation of said impellers will cause air to flow through said conduit means, into and through said shaft, and thence via the said passageways within said impeller discs into said material, said source of power being operable to rotate said diffuser unit at such speed that the air flowing into said material is in the form of attenuated streams of small diameter bubbles, which are of such dimensions that said streams of bubbles in ascending through said material produce circulating currents in the body of material contained in said tank, which currents flow across the surface of said body of material.

HAROLD T. JEFFERY.

REFERENCES CITED

The following references are of record in the file of this patent:

UNITED STATES PATENTS

| Number | Name | Date |
| --- | --- | --- |
| 94,730 | Field | Sept. 14, 1869 |
| 1,341,024 | Seale et al. | May 25, 1920 |
| 1,583,591 | Greenawalt | May 4, 1926 |
| 1,925,777 | Sperling | Sept. 5, 1933 |
| 1,988,351 | Fairchild | Jan. 15, 1935 |
| 2,187,746 | Lefevre | Jan. 23, 1940 |
| 2,212,841 | Maxwell | Aug. 27, 1940 |